United States Patent [19]
Giberson

[11] Patent Number: 5,886,505
[45] Date of Patent: Mar. 23, 1999

[54] APPARATUS AND METHOD FOR BRINGING ON LINE A LARGE SYNCHRONOUS CONDENSER THAT CANNOT BE STARTED BY AN ACROSS THE LINE START

[76] Inventor: Melbourne F. Giberson, 5 Spring Mill La., Haverford, Pa. 19041

[21] Appl. No.: 814,424

[22] Filed: Mar. 10, 1997

Related U.S. Application Data

[63] Continuation-in-part of Ser. No. 242,890, May 16, 1994, Pat. No. 5,610,500.

[51] Int. Cl.$^6$ ...................................................... H02P 9/00
[52] U.S. Cl. .............................. 322/100; 322/20; 310/261
[58] Field of Search ................................ 322/10, 100, 20; 290/1 R, 1 A, 1 C, 52; 310/261; 60/336

[56] References Cited

U.S. PATENT DOCUMENTS

| | | | |
|---|---|---|---|
| 3,663,948 | 5/1972 | Nagae et al. ................................. | 323/8 |
| 3,889,176 | 6/1975 | Randall ....................................... | 323/8 |
| 5,315,825 | 5/1994 | Giberson ..................................... | 60/336 |
| 5,505,662 | 4/1996 | Giberson ..................................... | 464/156 |
| 5,610,500 | 3/1997 | Giberson ..................................... | 322/100 |

*Primary Examiner*—Nestor Ramirez
*Assistant Examiner*—Nicholas Ponomarenko
*Attorney, Agent, or Firm*—Polster, Lieder, Woodruff & Lucchesi, LC

[57] ABSTRACT

A synchronous condenser has a rotor, a rotor shaft on which the rotor is mounted, and collector rings electrically connected to a source of D.C. voltage. A fluid drive has an output shaft connected to the synchronous condenser rotor shaft through a quick disconnect mechanism, an input shaft, and a motor connected to drive the input shaft. In bringing the synchronous condenser onto line, the speed of rotation of the output shaft of the fluid drive is brought to a speed slightly greater than the synchronous speed, a D.C. voltage is applied to the collector rings of the rotating field to generate a polyphase A.C. voltage in the windings in the stator core, and the polyphase breaker is closed just as the phases are brought into synchronization with the corresponding phases of the power grid. After the synchronization is complete, the disconnect coupling is operated to separate the starting mechanism and the starting mechanism is shut down. The entire process can be accomplished by remote control.

9 Claims, 2 Drawing Sheets

APPARATUS AND METHOD FOR BRINGING ON LINE A LARGE SYNCHRONOUS CONDENSER THAT CANNOT BE STARTED BY AN ACROSS THE LINE START

CROSS-REFERENCE TO RELATED APPLICATIONS

This application is a continuation in part of U.S. Ser. No. 08/242,890, filed May 16, 1994, now U.S. Pat. No. 5,610,500 the disclosure of which is incorporated herein by reference.

BACKGROUND OF THE INVENTION

One class of synchronous condensers is, as described in Ser. No. 08/242,890, now U.S. Pat. No. 5,610,500, essentially a large generator made for use as a turbine-generator, acting to improve the power factor of the power line or grid. As such, it serves a useful function, but it is not always needed, depending upon the power factor of the instantaneous load. Because the operation of the synchronous condenser consumes a certain amount of energy, approximately one percent of the rated MVA, it is desirable to be able to take it off line when it is not needed. Some synchronous condensers are designed with end windings of sufficient strength to be able to be started under the condition known as "across the line" start; wherein with the rotor not rotating, the contactor which connects the three phases of the motor or synchronous condenser is closed. At closure of the contactor, the connection out of phase, causes a corresponding large electro-magnetic force, which—produces a heavy torsional shock to the windings of the apparatus. These are not the synchronous condensers to which this invention is directed. The present invention has to do with turbine generators converted to synchronous condensers, or potentially, large synchronous condensers of a similar nature, that require an external starting mechanism. The end windings of the stator of such synchronous generators suffer most from the large electro-magnetic forces because the end windings are not supported as well as are the windings located in the axial slots in the stator core. Once up to operating speed, these electromotive forces are reduced.

In the case of the large generators made for service as a turbine driven generator, when used normally, the turbine is used to increase the speed to normal operating speed, and the rate of increase is very slow, from fifteen minutes to several hours. On the other hand, in an "across the line" start, it takes only 11 to 30 seconds to increase the speed from zero to full operating speed. Another reason, besides the torsional shock, for using a slow start for these large generators/synchronous condensers is related to the metallurgical properties of the rotor forgings. Many of them now in service and those that could be made in the future have alloy steel forgings with an alloy that acts more in a brittle manner at ambient or colder conditions, i.e. less than 70 degrees F., while at the normal operating conditions, i.e. above 120° F., the alloy behaves in a more ductile manner. This property is described as the "Fracture Appearance Transition Temperature, abbreviated "FATT". The temperature at which the alloy acts 50% brittle and 50% ductile is referred to as the FATT, also known to some metallurgists as the Ductile-Brittle Transition (DBT). An explanation can be found in *Marks' Standard Handbook for Mechanical Engineers*, eighth edition, Mc Graw Hill, publisher, pages 5-6 through 5-9. Thus it is important to assure that the operating temperature of a generator/synchronous condenser is above the FATT before the rotor is operated at high speed, in order to assure that the material is acting in the ductile range before being subjected to high tensile stress from either (a) centrifugal forces or (b) high bending stresses associated with large amplitudes which can be encountered during high amplitude lateral vibratory conditions which occur when the rotor speed passes through the critical speed of the rotor bearing system.

Failures of generators in the past have been related to both of these factors. Large generator rotors have failed when started under cold conditions directly. Metallurgical examination identified operation at a temperature below the FATT to be the source of the later failure. Further, large generators with the rotor assembly at rest have inadvertently been connected electrically to the grid, causing damage to the generator windings, particularly the end windings.

In addition to the desirability of being able to bring up the speed of rotation of the synchronous condenser at a controlled rate, slowly relative to the rate at which an "across the line" start would be, it is desirable to be able to locate the synchronous condenser in any portion of the electrical distribution system where the benefits of a synchronous condenser are desired, to make the system self-starting, with an unmanned start and a remote start from a system operator's control board. These latter characteristics are similar to those of existing systems for gas turbine generators, and the application to the system of this invention of the electronic control technology for remote starting and synchronization of gas turbine generators to the power grid, will be apparent to those skilled in the art.

One of the objects of this invention is to provide a relatively inexpensive apparatus and method for bringing a large rotating synchronous condenser onto line.

Another object is to accomplish the task of bringing the synchronous condenser up to speed at a controlled rate.

Still another object is to permit starting of the synchronous condenser from a control station completely remote from the site of the synchronous condenser.

Other objects will become apparent to those skilled in the art in the light of the following description and accompanying drawings.

BRIEF SUMMARY OF THE INVENTION

In accordance with this invention, generally stated, a synchronous condenser particularly of the type described in co-pending application 08/242,890, now U.S. Pat. No. 5,610,500, of which this application is a continuation in part, and the teaching of which is incorporated herein by reference, an extension shaft with journal and thrust bearings is connected to the end of the rotor shaft of the synchronous condenser. A quick disconnect coupling is connected to the extension shaft and to the output shaft of a fluid drive. The fluid drive is driven by gears on an input shaft of the fluid drive and the drive shaft of a motor, in the illustrative embodiment shown, an induction motor. In use, the disconnect coupling is engaged with the synchronous condenser rotor at rest or substantially so, a DC voltage is placed on the field of the rotor, the motor is started, the scoop tube of the fluid drive is operated to regulate the speed, ultimately to synchronous speed, the D.C. exciting voltage is varied to match the terminal voltages, one set for the synchronous condenser and one for the grid, the synchronous condenser is run slightly faster than the grid voltage would require for synchronization, the line-connecting breakers are closed, timing the phase matching so that the phases are exactly in registry when the actual contact is made, and the quick disconnect is actuated to disconnect the fluid drive from the rotor shaft, after which the electric motor can be deenergized. Alternately, a quick disconnect coupling of an overriding design could be used, so that after synchronization, as the speed of the output shaft of the fluid drive is slowed down, the disconnect coupling would automatically disengage.

DETAILED DESCRIPTION OF THE INVENTION

Figure 1:
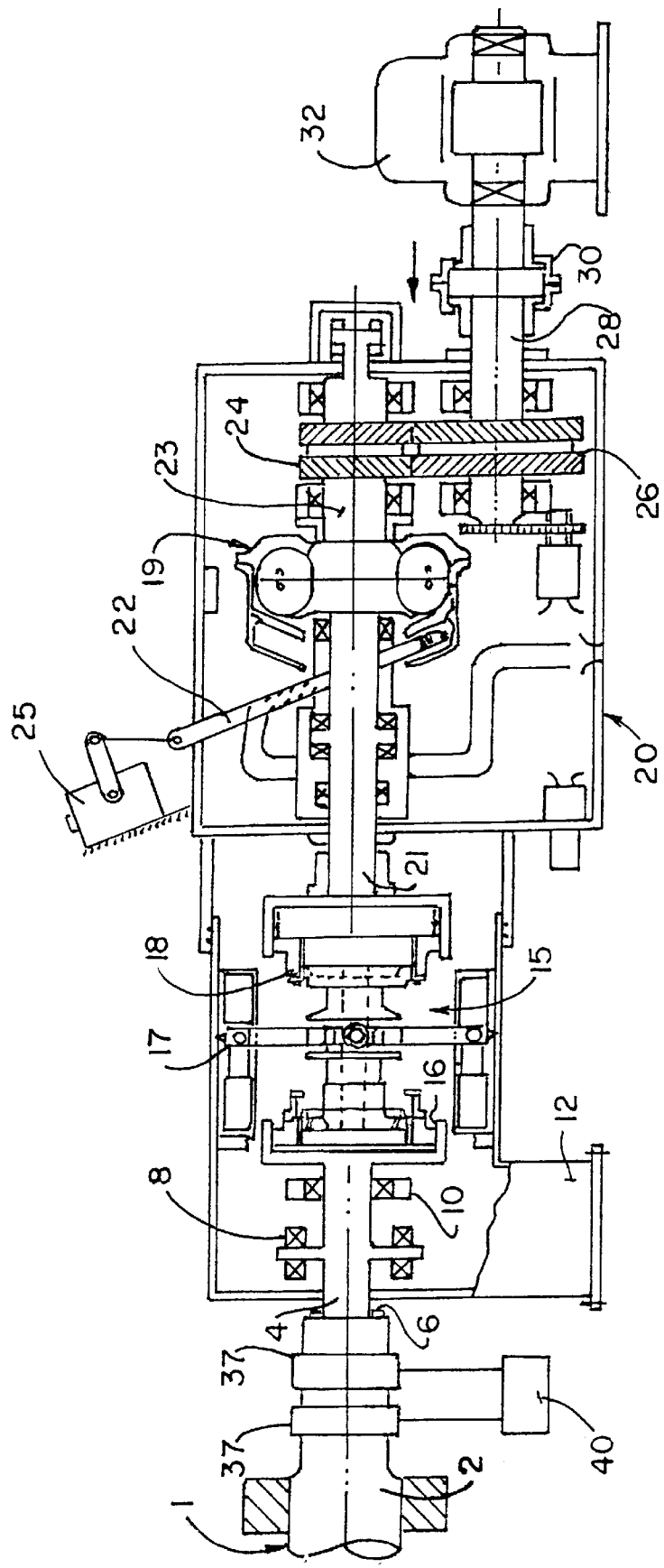
FIG. 1 is a view in side elevation, partly in section and partly broken away, of one illustrative embodiment of the synchronous condenser starter of this invention.
Figure 2:
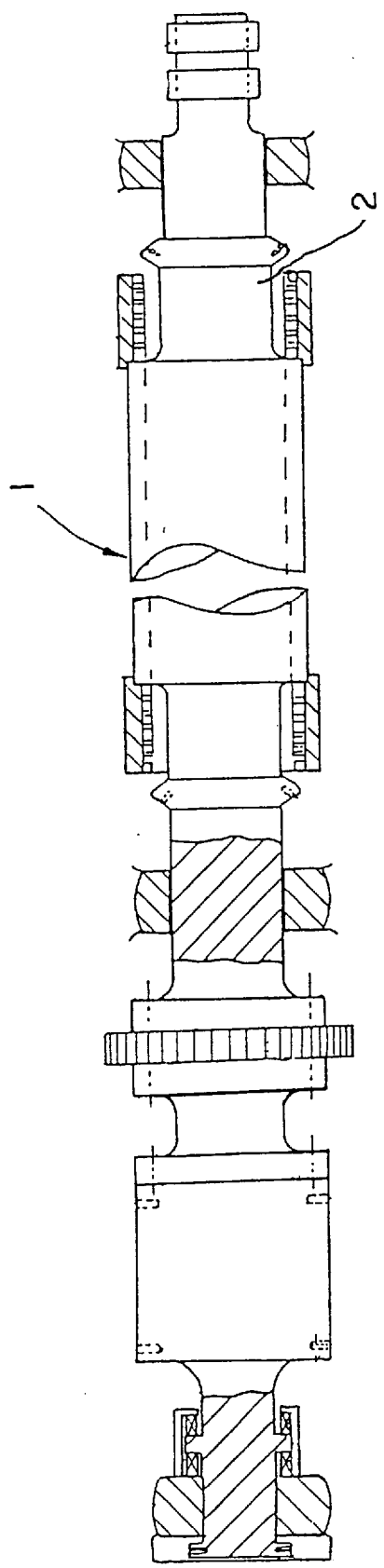
FIG. 2 is a view in side elevation, with different reference numerals, of FIG. 5 of application Ser. No. 08/242,890, now U.S. Pat. No. 5,610,500.

Referring now to the drawings for one illustrative embodiment of starting mechanism of this invention, reference numeral 1 indicates the rotor of a synchronous condenser, with a rotor shaft 2, and collector rings 37. The collector rings 37 are connected electrically to a source 40 of D.C. voltage. The source 40 can be an A.C. motor driven D.C. generator with voltage control, or a static exciter. The static exciter is preferred because it has a much faster reaction time than the AC DC generator and thereby can provide better control of the power factor function of the synchronous condenser. The outer end of the rotor shaft 2 is bolted to an end of an extension shaft 4 by bolts 6. The extension shaft 4 is journalled in a journal bearing 10 supported by a pedestal 12, which also supports a thrust bearing 8. The extension shaft 4 is connected to a disengaging gear 16 of a quick disconnect mechanism 15, which can be of the kind shown and described in U.S. Pat. No. 5,505,662. A constantly engaged gear 18 of the quick disconnect is connected to an output shaft 23 of a fluid drive 19. The fluid drive 19 can be of the types shown and described in U.S. Pat. No. 5,315,825, but a particularly useful fluid drive is available from Turbo Research Incorporated, model A-4. The fluid drive 19 has the usual scoop tube 22 and scoop tube controller 25, shown somewhat schematically in FIG. 1. An input shaft 23 of the fluid drive has mounted on it a driven gear 24, which can be either a single helix or double helix. The gear 24 meshes with a drive gear 26, mounted on a driven shaft 28 journalled in the fluid drive housing. The driven shaft 28 is connected, through a gear or dry diaphragm coupling 30, to a shaft of, typically, an induction motor 32. The induction motor runs at a substantially constant speed, less than the speed at which the output shaft of the fluid drive will be driven to bring the rotor of the synchronous condenser to speed. In the case of a synchronous motor, which can be used as an alternative, the motor speed is typically less than or exactly equal to the speed of the synchronous condenser. Because the fluid drive requires a slip speed to transmit power, the gears 24 and 28 are sized to increase the speed of rotation of the input shaft of the fluid drive sufficiently to compensate for speed losses in the fluid drive, of approximately 2.5 to 5%, and simultaneously to permit the output shaft of the fluid drive to rotate at a speed slightly higher than the synchronous speed of the electrical power line or grid. The fluid drive can be light duty compared with the fluid drives described in U.S. Pat. No. 5,315,825, because it will be in use for only fifteen minutes or so at a time, and suitable used fluid drives can be found. The motor 32 need be only three hundred to one thousand horsepower to bring a 30 to 100 megawatt generator/synchronous condenser to speed.

In use, the synchronous condenser disconnect coupling is engaged when the synchronous condenser is at rest or on turning gear rotating at approximately 2 to 5 RPM, a D.C. excitation voltage, in the neighborhood of 375 volts, is placed on the field of the rotor through the collector rings 37, the motor is started, the scoop tube of the fluid drive is operated to regulate the speed, ultimately to synchronous speed, the D.C. exciting voltage is varied to match the terminal voltages, one set for the synchronous condenser and one set for the grid, the synchronous condenser is run slightly faster than the grid voltage would require for synchronization, the line-connecting breakers are closed, timing the phase matching so that the phases are substantially in registry when the actual contact is made, and the quick disconnect is actuated to disconnect the fluid drive from the rotor shaft, after which the electric motor can be deenergized. The use of a synchroscope to synchronize the phases is well known, the type of synchroscope used being one designed for remote signaling, such as is used for synchronizing generators for remotely started gas turbine generators. The scoop tube of the fluid drive can also be controlled remotely, and commonly is. Accordingly, the system of this invention can be controlled from an operator's station at a site remote from the synchronous condenser. It can be seen that by the use of the fluid drive as described, the generator/synchronous condenser can be brought to speed as slowly or quickly as desired. The use of a constant speed motor also simplifies matters; it need only be turned on and off.

Numerous variations within the scope of the appended claims will occur to those skilled in the art in the light of the foregoing disclosure. Merely by way of illustration, a variable frequency drive motor can be used instead of the constant speed motor and fluid drive, but the quick disconnect remains in place. A different kind of disconnect mechanism can be used, such as an overrunning clutch. The fluid drive can be powered by a power source different from an electric motor, such as a diesel engine or even a small gas turbine. These are merely illustrative.

I claim:

1. The method of bringing a synchronous condenser on line with a polyphase A.C. electricity distributing grid, said synchronous condenser having a rotor shaft, collector rings, and a rotor mounted on said shaft, comprising connecting a fluid drive to said rotor shaft, said fluid drive having an input shaft connected to an external power source, an output shaft and means for varying the speed of rotation of said output shaft with respect to the speed of rotation of the input shaft, said output shaft being connected to said synchronous condenser rotor shaft, driving said fluid drive input shaft by said external power source at a speed greater than the synchronous speed of said synchronous condenser, bringing the speed of rotation of said fluid drive output shaft, hence said rotor shaft, up to synchronous speed, applying a D.C. voltage to said collector rings to establish an A.C. phase relation, synchronizing said phase relation, and connecting said synchronous condenser to said grid as said phase relation is synchronized.

2. The method of claim 1 including a next step of disconnecting the output shaft from the rotor shaft.

3. The method of claim 1 wherein the steps are accomplished by remote control.

4. Apparatus for bringing a synchronous condenser on line, said synchronous condenser having a rotor, a rotor shaft on which said rotor is mounted, and collector rings electrically connected to a source of D.C. voltage, a fluid drive having an output shaft connected to said synchronous condenser rotor shaft, an input shaft, and means for driving said fluid drive.

5. The apparatus of claim 4 including a quick disconnect coupling between said fluid drive and said synchronous condenser rotor shaft.

6. The apparatus of claim 4 wherein said means for driving said fluid drive include a constant speed motor.

7. The apparatus of claim 6 including gears connected to drive said fluid drive input shaft at a speed higher than the speed of the motor.

8. Apparatus for bringing a synchronous condenser on line, said synchronous condenser having a rotor, a rotor shaft on which said rotor is mounted, and collector rings electrically, a source of D.C. voltage electrically connected to said collector rings, external power means connected to said synchronous condenser rotor shaft for rotating said rotor shaft, means for selectively adjusting the speed of rotation of said power means, and a quick disconnect mechanism connected between said power means and said rotor shaft, for selectively connecting and disconnecting said power means and said rotor shaft.

9. The apparatus of claim 8 wherein means for varying selectively the voltage applied to said collector rings from said source, for operating the means for adjusting the speed of rotation of said power means, and for actuating said quick disconnect mechanism are situated at a site remote from said synchronous condenser.

* * * * *